Patented July 14, 1942

2,290,054

UNITED STATES PATENT OFFICE 2,290,054

PURIFICATION PROCESS

William B. Johnston, Stamford, Conn., assignor to American Cyanamid Company, New York, N. Y., a corporation of Maine No Drawing. Application September 23, 1939, Serial No. 296,290

8 Claims. (Cl. 260—666)

This invention relates to the purification of hydrocarbons which are essentially composed of non-conjugated hydrocarbons but which contain relatively small amounts of conjugated dienes and in some cases alcohols as impurities. It is particularly directed to the purification of terpene hydrocarbons.

It has been proposed to use maleic anhydride to conjugated dienes from materials which are essentially composed of non-conjugated hydrocarbons but this process is objectionable because the maleic anhydride reacts with non-conjugated as well as conjugated unsaturates to an appreciable extent and furthermore the maleic anhydride is very corrosive towards steel, iron, aluminum, stainless steel and other metallic vessels. Moreover, since maleic anhydride is a low melting solid, sublimes easily at low temperature and is quite soluble in hydrocarbons it is difficult to remove the excess of unreacted anhydride from the hydrocarbons except by aqueous extraction.

One object of this invention is to remove the conjugated, unsaturated impurities such as the conjugated terpenes from distillates which are essentially non-conjugated hydrocarbons, and particularly terpene hydrocarbons.

Another object of this invention is to remove alcohols which are present as impurity in distillates which are essentially non-conjugated hydrocarbons.

Still another object of this invention is to recover as resinous by-products the impurities which are removed from distillates which are essentially non-conjugated hydrocarbons.

It is also an object of this invention to eliminate the yellow color or the substances which tend to develop a yellow color upon aging and also objectionable odor of terpene distillates which are essentially non-conjugated terpenes.

These and other objects are attained by refluxing fumaric acid with the terpene distillate to be purified and separating the unreacted non-conjugated terpene from the unreacted fumaric acid and the resinous by-products formed from the impurities by their reaction with fumaric acid. The following examples are given by way of illustration and not in limitation.

Example 1

| | Parts by weight |
|---|---|
| Fumaric acid | 50 |
| Impure dipentene | 300 |

This mixture is placed in a suitable reaction chamber which is provided with an agitator and a reflux condenser. The mixture is refluxed at about 160°–185° C. for about five to six hours. The solid fumaric acid which is unreacted is filtered off and may be used in another purification process. The liquid portion is distilled under a vacuum of 3–5 mm. of mercury at about 30°–40° C., leaving as a residue a dark colored, viscous, high boiling resinous by-product. The distillate is a purified dipentene which is water white and is substantially free from conjugated terpenes, alcohols and other such impurities. The product has a much fainter odor than the original impure dipentene and produces resins having much lighter color when reacted with resin-forming materials.

Fumaric acid is easily removed from hydrocarbons by filtration because of its low solubility in the hydrocarbons, its extremely high melting point and its low volatility. Aqueous extraction is, therefore, not necessary and it is merely necessary to filter or centrifuge the excess of unreacted fumaric acid from the treated materials. Furthermore, fumaric acid reacts with conjugated dienes selectively without any substantial reaction with non-conjugated unsaturated hydrocarbons. Fumaric acid also has another advantage in that it is substantially non-corrosive towards metal containers.

Example 2

| | Parts by weight |
|---|---|
| Fumaric acid | 50 |
| Impure terpinolene | 300 |

This mixture is refluxed with agitation for about five to six hours in the same way as described in Example 1. The unreacted fumaric acid is separated from the mixture and the purified terpinolene is distilled off at 3–5 mm. of mercury at about 30° C., leaving a viscous, resinous by-product. The purified terpinolene is water white and possesses a very faint odor as compared to the unpurified terpinolene.

Terpenes treated by this invention and stored in glass bottles exposed to light for a year at room temperature do not yellow as the untreated materials usually do.

Other terpene distillates which are essentially non-conjugated terpenes may be purified in the same general manner as that described above. Among these are crude pinene distillates or mixtures containing dipentene, terpinolene and/or alpha or beta pinene.

My process is generally best carried out under reflux conditions although other conditions could be used if the temperature be maintained between about 160°–185° C., and preferably at about 175° C. My process may be used for purifying other hydrocarbon distillates containing dienes or other unsaturates which have a conjugated structure. Among these are: cracked petroleum fractions (such as gasolines), kerosenes, mixed spirits, solvent naphthas, etc., coal tar distillates (containing as impurities dicyclopentadiene, styrene, butadiene, isoprene, cumarone, indene, etc.)

The resinous by-products which are obtained according to my invention may be used for a wide variety of purposes such as in coating compositions including lacquers, varnishes, paints, etc., as resinous binders with various fillers for floor coverings, gaskets, in printing inks, etc.

The purified terpene distillates made according to my invention are particularly suited for use in the formation of synthetic resins such as by reaction with an alcohol and fumaric acid in the presence of a catalyst. Furthermore, these purified terpene distillates are especially suitable for use as solvents in coating compositions since they are of light color and do not have an objectionable odor.

Obviously many modifications and variations in the processes described above may be made without departing from the spirit and scope of the invention as defined in the appended claims.

I claim:

1. A process of purifying a material which is essentially composed of non-conjugated unsaturated hydrocarbons which comprises treating the material with fumaric acid at about 160°–185° C. whereby the fumaric acid selectively reacts with the conjugated hydrocarbon, and separating the unreacted non-conjugated hydrocarbons from the reaction mixture.

2. A process of purifying a terpene distillate which is essentially non-conjugated terpene which comprises treating such a distillate with fumaric acid at about 160°–185° C. whereby the fumaric acid selectively reacts with the conjugated terpenes, and separating the unreacted and purified non-conjugated terpenes from the reaction mixture.

3. A process of purifying a terpene distillate which is essentially non-conjugated terpene which comprises refluxing said distillate with fumaric acid whereby the fumaric acid selectively reacts with the conjugated terpenes, and separating the unreacted and purified non-conjugated terpenes from the reaction mixture.

4. A process which comprises refluxing fumaric acid with a material which is essentially non-conjugated terpene whereby the fumaric acid selectively reacts with the conjugated terpene, separating the unreacted fumaric acid from the mixture and distilling off the purified non-conjugated terpene from the mixture.

5. A process of removing conjugated hydrocarbons and alcohols from a distillate which is essentially non-conjugated terpene which comprises refluxing said distillate with fumaric acid and separating the purified non-conjugated terpene.

6. A process as in claim 5 wherein the non-conjugated terpene is dipentene.

7. The process as in claim 5 wherein the non-conjugated terpene is terpinolene.

8. The process as in claim 5 wherein the non-conjugated terpene is a pinene.

WILLIAM B. JOHNSTON.